US009746960B2

(12) United States Patent
Ding et al.

(10) Patent No.: US 9,746,960 B2
(45) Date of Patent: Aug. 29, 2017

(54) HANDLING OF ELECTROMAGNETIC INTERFERENCE IN AN ELECTRONIC APPARATUS

(71) Applicants: APEX MATERIAL TECHNOLOGY CORP., Keelung (TW); IMAGINATION BROADWAY LTD., New Taipei (TW)

(72) Inventors: Ke-hao Ding, Keelung (TW); Zong-Bin Liao, Keelung (TW); Zhong-peng Qiu, Keelung (TW); Shang-Li Lee, Keelung (TW)

(73) Assignees: APEX MATERIAL TECHNOLOGY CORP., Keelung (TW); IMAGINATION BROADWAY LTD., New Taipei (TW)

( * ) Notice: Subject to any disclaimer, the term of this patent is extended or adjusted under 35 U.S.C. 154(b) by 220 days.

(21) Appl. No.: 14/534,659

(22) Filed: Nov. 6, 2014

(65) Prior Publication Data

US 2015/0123677 A1    May 7, 2015

Related U.S. Application Data

(60) Provisional application No. 61/900,989, filed on Nov. 6, 2013.

(30) Foreign Application Priority Data

Dec. 17, 2013 (TW) .............................. 102146566 A
Dec. 17, 2013 (TW) .............................. 102146568 A

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04108* (2013.01)

(58) Field of Classification Search
CPC ......... G06F 3/0418; G06F 2203/04108; G06F 3/044; G06F 3/041; G01R 29/26
(Continued)

(56) References Cited

U.S. PATENT DOCUMENTS 8,598,894 B2 * 12/2013 Philipp ................. G06F 3/0418
324/613
2011/0310051 A1 * 12/2011 Souchkov ............. G06F 3/0416
345/174
(Continued)

FOREIGN PATENT DOCUMENTS

TW        201030585 A1    8/2010
TW        201405404 A     2/2014

*Primary Examiner* — Tung X Nguyen
*Assistant Examiner* — Akm Zakaria
(74) *Attorney, Agent, or Firm* — WPAT, PC

(57) ABSTRACT

The present invention provides a control module and a method operable in a touch-sensitive apparatus for measuring noise, wherein the touch-sensitive apparatus comprises a touch-sensitive module having a plurality of first electrodes and a plurality of second electrodes that intersect in multiple regions of the touch sensitive module, said method comprising the steps of: disconnecting the first electrodes from a driving voltage source; and acquiring a plurality of voltage values of noise by measuring a plurality of voltage signals associated with the second electrodes over a plurality of measurement cycles at a predetermined operating frequency during the first electrodes without a driving voltage.

18 Claims, 11 Drawing Sheets

(58) Field of Classification Search
USPC .......................................................... 324/613
See application file for complete search history.

(56) References Cited

U.S. PATENT DOCUMENTS

| | | |
|---|---|---|
| 2012/0206407 A1 | 8/2012 | Taylor et al. |
| 2014/0028623 A1 | 1/2014 | Edwards et al. |
| 2014/0225856 A1* | 8/2014 | Shepelev .............. G06F 3/0418 345/174 |
| 2015/0286335 A1* | 10/2015 | Haga .................... G06F 3/0418 345/174 |

* cited by examiner

HANDLING OF ELECTROMAGNETIC INTERFERENCE IN AN ELECTRONIC APPARATUS

CROSS-REFERENCE TO RELATED APPLICATIONS

The present application claims the benefit of priority to U.S. Provisional Patent Application No. 61/900,989 filed Nov. 6, 2013, entitled "Touch Recognition Method and Noise Reduction Method thereof", and Taiwan patent application No. 102146566 and No. 102146568 filed Dec. 17, 2013, entitled "Touch Sensitive Control Device and Electronic Apparatus and Method Thereof", the benefit of priority of each of which is claimed hereby, and each of which are incorporated by reference herein in its entirety.

FIELD OF THE INVENTION

The present invention pertains to a touch-sensitive screen, and more particularly pertains to a noise handling method for touch detection in a touch-sensitive screen.

BACKGROUND OF THE INVENTION

A touch-sensitive screen enables the users to interact directly with what is displayed, and it becomes a popular user interface and is used widely in a variety of applications including automotive, aviation, marine, and consumer electronic applications, e.g. smartphone, tablet PC etc. There are a variety of touchscreen technologies that have different methods of sensing touch, including but not limited to, resistive type, surface capacitive type, projected capacitive type, infrared type, surface acoustic wave, and so on.

General speaking, mostly the methods of sensing touch are more or less susceptible to outside electromagnetic interference except the sensing touch methods of infrared and surface acoustic wave. While the present invention will be described in conjunction with a capacitive touch-sensitive apparatus, it will be understood that the descriptions are not intended to limit the present invention to this kind of touch sensing apparatus. On the contrary, a touch-sensitive apparatus using other types of touch sensing may apply the spirit of the present invention.

The sensing principle of projected capacitive touch apparatus are operated by measuring tiny changes in capacitance on an electrode due to a proximity or a touch (hereinafter called "proximity") upon a touch apparatus caused by a human fingers or other objects. While electronic products are increasingly used in modern life, the effect of electromagnetic noise radiated by those electronic products is of growing concern. The interference voltages are coupled capacitively from electromagnetic noise sources that are both internal and external to the projective capacitive touch device. These interference voltages cause charge movement within the projected capacitive touch apparatus, which may be confused with the measured charge movement due to proximity upon the touch apparatus by a human fingers or other objects. The probability of identifying false touches by a touch control system of a projective capacitive touch screen will increase especially when the operating frequency of the projected capacitive touch apparatus is quite close to that of undesired electromagnetic noise.

FIG. 1 is a sinusoidal waveform diagram illustrating external electromagnetic waves in accordance with an embodiment of the present invention. As shown in FIG. 1, there are two example waveforms 110 and 102 which are sinusoidal noise with distinct frequency and amplitude. The interference voltages are coupled capacitively from electromagnetic noise sources 110 and/or 102 to a projective capacitive touch device during a proximity event caused by a user. For the projective capacitive touch device, the electromagnetic noise sources 110 and/or 102 are unknown. In other words, it is difficult to anticipate for the touch control system of the projective capacitive touch about the measured charge variation how much amount coupled from electromagnetic noise sources 110 and/or 102.

Accordingly, there is a need in the art about a proximity detection method, a touch-sensitive control device, and a touch sensitive apparatus against external electromagnetic interference, especially sinusoidal noise, to improve accuracy of proximity detection operation.

SUMMARY OF THE PRESENT INVENTION

In an embodiment of the present invention, there is provided a method operable in a touch-sensitive apparatus for measuring noise, wherein the touch-sensitive apparatus comprises a touch-sensitive module having a plurality of first electrodes and a plurality of second electrodes that intersect in multiple regions of the touch sensitive module, said method comprising the steps of: disconnecting the first electrodes from a driving voltage source; and acquiring a plurality of voltage values of noise by measuring a plurality of voltage signals associated with the second electrodes over a plurality of measurement cycles at a predetermined operating frequency during the first electrodes without a driving voltage.

In another embodiment of the present invention, there is provided a control module operable in a touch-sensitive apparatus for measuring noise, wherein the touch-sensitive apparatus comprises a touch-sensitive module having a plurality of first electrodes and a plurality of second electrodes that intersect in multiple regions of the touch sensitive module, said control module comprising: a driving control module for disconnect the first electrodes from a driving voltage source; and a noise measurement module for acquiring a plurality of voltage values of noise by measuring a plurality of voltage signals associated with the second electrodes over a plurality of measurement cycles at a predetermined operating frequency during the first electrodes without a driving voltage.

In still another embodiment of the present invention, there is provided a touch-sensitive apparatus comprising a touch sensitive module configured to receive and response fingers or hands of users in the close proximity of the surface, wherein the touch sensitive module comprises a plurality of first electrodes and a plurality of second electrodes that intersect in multiple regions; and a touch control module connected to the touch sensitive module and operable for measuring external noise of the touch-sensitive module to select an optimal measurement mode for proximity detection operation, said touch control module comprising: a driving control module for disconnect the first electrodes from a driving voltage source; and a noise measurement module for acquiring a plurality of voltage values of noise by measuring a plurality of voltage signals associated with the second electrodes over a plurality of measurement cycles at a current operating frequency during the first electrodes without a driving voltage.

DETAILED DESCRIPTION OF THE INVENTION

Reference will now be made in detail to embodiments of the present invention, examples of which are illustrated in the accompanying drawings. While the present invention will be described in conjunction with embodiments, it will be understood that the descriptions are not intended to limit the present invention to these embodiments. On the contrary, the descriptions are intended to cover alternatives, modifications and equivalents, which may be included within the spirit and scope as defined by the appended claims. Furthermore, in the following detailed description, numerous specific details are set forth in order to provide a thorough understanding of embodiments of the present invention. However, one of ordinary skill in the art will understand that embodiments of the present invention may be practiced without these specific details. In other instances, well known methods, procedures, components, and circuits have not been described in detail as not to unnecessarily obscure aspects of the present invention.

Figure 2:
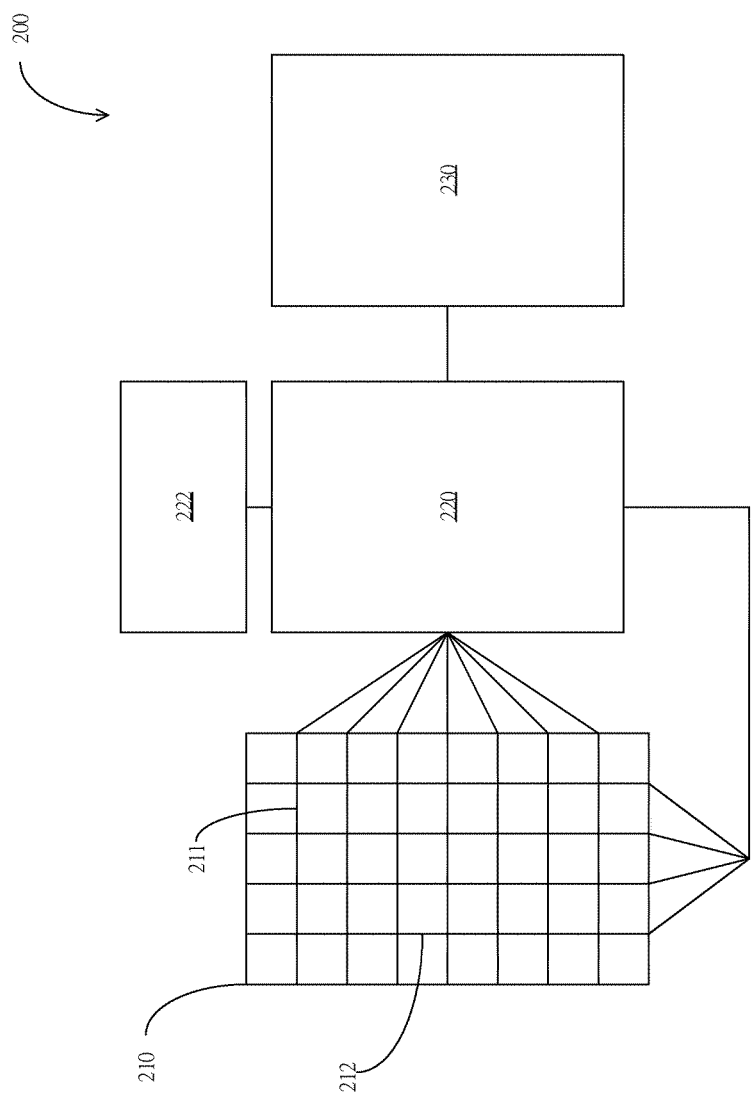
FIG. 2 is a block diagram illustrating an electronic system with touch function in accordance with an embodiment of the present invention.

Referring to FIG. 2, there is shown a block diagram which illustrates an electronic system 200 with touch function in accordance with an embodiment of the present invention. The electronic system 200 can include a touch-sensitive module 210, a touch control module 220 connected to the touch-sensitive module 210, and a central processor 230 connected to the touch control module 220. However, one of ordinary skill in the art would understand that the electronic system 200 can include other unrelated components, for the purpose of simplicity, not depicted in the drawings.

According to one embodiment, the touch-sensitive module 210 can be a part of a touch screen, or a part of a touch keyboard/keypad. The touch-sensitive module 210 generally includes a substrate, but not limited to, on which a plurality of first electrodes 211 arranged in a first direction and a plurality of second electrodes 212 arranged in a second direction are formed. Depending on the design, functionality, and performance requirements, a few to hundreds of electrode intersections formed by the first electrodes 211 and the second electrodes 212 are disposed. The first electrodes 211 and the second electrodes 212 are respectively coupled to the touch control module 220. The type of their connection or coupling to the touch control module 220 is not required as shown in FIG. 2. The present disclosure does not limit the type of connections or coupling. If the touch-sensitive module 210 belongs to a type of projected capacitive touch, mutual capacitances existing between the first electrodes 211 and the second electrodes 212 at locations where they intersect, such mutual capacitances changing in the presence of one or more fingers or touch devices brought into proximity thereto. Therefore, a touch or a close proximity event is then sensed by changes in the electrical field at the intersection with the touch control module 220.

The touch control module 220 can include, but not limited to, logic circuits, an embedded processor, and/or a signal processor. The processor can download a program from a non-volatile memory 222, and the processor can read an electronic signal. The aforementioned program and electronic signal are utilized to control the first electrodes 211 and the second electrodes 212 for detecting a proximity event of fingers. The code of implementation of the present disclosure is also included in the program. In one embodiment, the touch control module 220 and the non-volatile memory 222 can be integrated together in a single IC (integrated circuit) chip. In another embodiment, the touch control module 220 and the non-volatile memory 222 can reside separately in different IC chips. The connection depicted in the drawings between the touch control module 220 and the non-volatile memory 222 is not required to be direct, as shown in FIG. 2.

The central processor 230 can execute the operating system and functions of the electronic system 200, and the central processor 230 can receive these trigger signals from the touch control module 220. These trigger signals are used to notify the proximity event occurred on the touch-sensitive module 210. In one embodiment, the central processor 230 and the touch control module 220 can be integrated together in a single IC chip. In another embodiment, the central processor 230 and the touch control module 220 can reside separately in different IC chips. The connection depicted in the drawings between the central processor 230 and the touch control module 220 is not required to be direct, as shown in FIG. 2.

Figure 3:
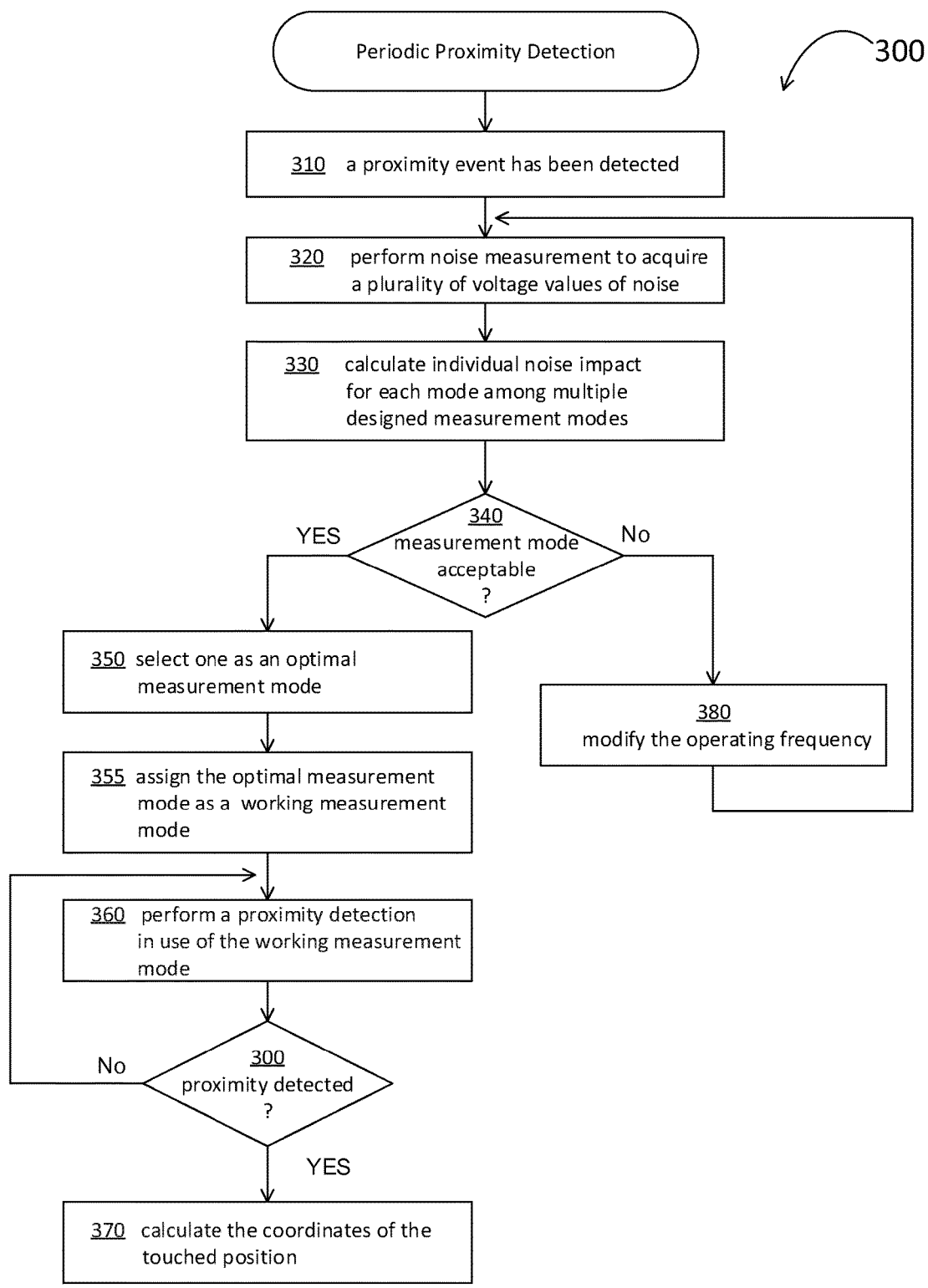
FIG. 3 is a flowchart illustrating a method for determining a coordinate position in response to a proximity detection for a touch-sensitive apparatus in accordance with an embodiment of the present invention.

FIG. 3 is a flowchart illustrating a method for determining a coordinate position in response to a proximity detection for a touch-sensitive apparatus in accordance with an embodiment of the present invention. While touch sensing systems are designed to only measure signals related to a user's proximity, noise signals generated from AC/DC chargers, liquid crystal displays, and so forth, so the touch signals cannot be properly measured. Accordingly, a noise handling and mode selection method is herein described, and it is not about noise cancelling but identifying an optimal measurement mode for measurement operation with noise suppression effect, especially for sinusoidal noises. As mentioned above, according to one embodiment, the method 300 can be implemented in the form of programs stored into non-volatile memory 222 and executed by the central processor 230 which is embedded in the touch control module 220.

Alternatively, according to another embodiment, the method 300 can be implemented in the form of logic circuits.

In this embodiment, the method is executed in a manner of iteration to select an optimal measurement mode for measurement operation, which can reduce noise interference from sinusoidal noise. The method may begin at a periodic proximity detection on a touch-sensitive apparatus 200, and a proximity event on a touch-sensitive apparatus 200 has been detected (block 310). The coupled noise induced on a touch-sensitive module 210 may cause the touch control module 220 to identify false touches or determine incorrect touch locations. To design optimal measurement modes for measurement operation with noise suppression effect, firstly the noise measurements are made (block 320). In one embodiment, the noise measurements are based on measurement by charge transfer, that is, measurement of induced charge from extraneous noise, for example, on a capacitances existing between the first electrodes 211 and the second electrodes 212 at locations where they intersect.

The noise measurement is analogous to a signal measurement but without driving voltage supplied to the first electrodes 211. The touch control module 220 stops supplying a driving voltage to the first electrodes 211, and make the second electrodes 212 configured in a floating potential and measured for multiple times during a predetermined period of time, thereby a plurality of measurement results obtained. Without applying a driving voltage to the first electrodes 211, there is no induced electric field between the first electrodes 211 and the second electrodes 212. Under this situation, the measured results on the second electrodes 212 are not influenced even though a proximity of a body or fingers occurs. In another word, the induced charges on the second electrodes 212 only comes from coupled noise, and the measured voltages on the second electrodes 212 are results of charge integration since the second electrodes 212 is configured in a floating potential. In this manner, the noise measurements can be implemented. Since the same circuit elements and interconnects are used for measurement, the noise measurements can be made without any additional hardware requirement for the touch control module 220.

After a plurality of measurement results, i.e. voltage values, are acquired over a plurality of measurement cycles (block 320), the method proceeds to calculate individual noise impact (alternatively called evaluation of noise) for each measurement mode among multiple designed measurement modes at the current operating frequency (block 330) according to the measured voltage values of noise. Each of the plurality of designed measurement modes corresponds to a combination of a plurality of forward operations and a plurality of reverse operations. Based on various and defined order composed by a plurality of "forward" measurement operations and a plurality of "reverse" measurement, the plurality of designed measurement modes can be formed. The so-called "forward" and "reverse" measurement operations, which measure voltage output in response to proximity detection, have been disclosed in U.S. patent application Ser. No. 14/486,049, titled "TOUCH RECOGNITION METHOD AND SYSTEM FOR A CAPACITIVE TOUCH APPARATUS", filed Sep. 15, 2014. it will be understood by those skilled in the art that the measured voltage output in response to "forward" and "reverse" measurement operations about a proximity of fingers has a reverse voltage output, however, the noise impact, which has gone through calculation and ends up with an absolute value, can be treated as the same regardless of "forward" or "reverse" measurement operations.

Figure 1:
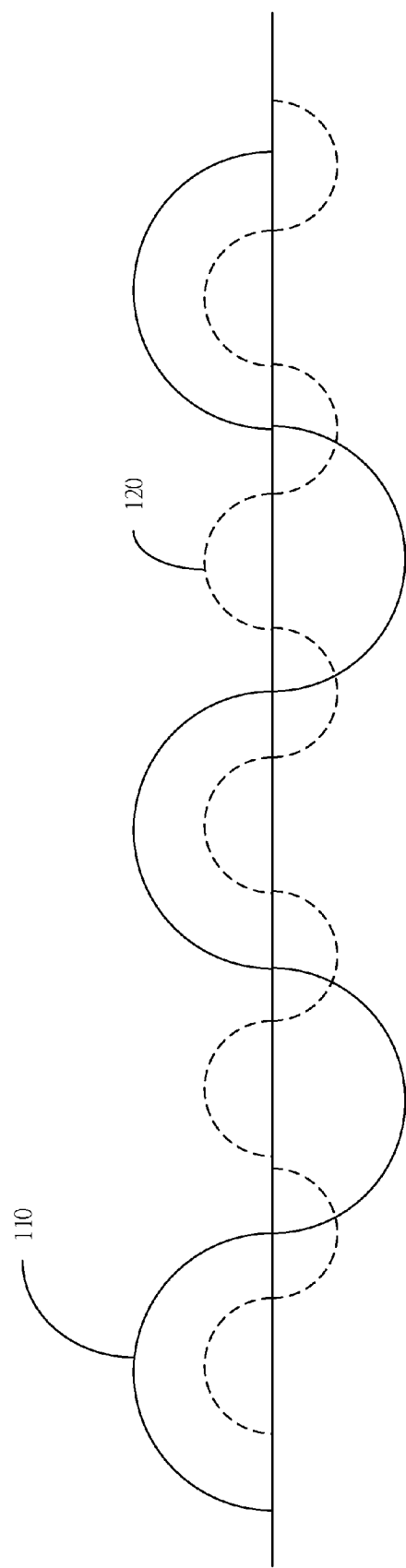
FIG. 1 is a sinusoidal waveform diagram illustrating external electromagnetic waves in accordance with an embodiment of the present invention.

Electromagnetic noise is induced on capacitive touch apparatus from a variety of sources, and herein the present invention focuses on reducing false measurement results caused by a sinusoidal noise with waveform characteristic such as 110 and 102 shown in FIG. 1. According to a feature of sinusoidal noise, the same sinusoidal noise can cause a different noise strength by different measurement modes in use. Accordingly, individual noise strength for each measurement mode at a certain operating frequency is calculated.

When the process of the noise impact (alternatively called evaluation of noise) versus the designed measurement modes in block 330 is completed, the method proceeds to the block 340. A step of comparing the evaluations of noise with a threshold value and check whether at least one evaluation of noise corresponding with the designed measurement modes is below a threshold value (block 340). Namely, a determination can be made on whether at least one of the measurement modes is acceptable (block 340). If at least one of the evaluation of noise corresponding with a certain measurement mode is below a threshold value (YES from block 340), it is determined that at least one acceptable measurement mode has been found. If none of the evaluation of noise corresponding with a certain measurement mode is below a threshold value (NO from block 340), it is determined that all the measurement modes are unacceptable at a current operating frequency. In other words, the method proceeds to block 350 when there is at least existing one measurement mode with acceptable noise impact. If not so, the operating frequency of the touch control module 220 is modifies (block 380).

An optimal measurement mode is selected from among all measurement modes with acceptable noise impact (block 350), the guidelines of measurement mode selection as a working measurement mode for operation herein does not only depend on a measurement mode which has a minimum noise impact among all measurement modes but also take stability of noise impact into consideration.

When the process of selecting a measurement mode for measurement operation in block 350 is completed, the method proceeds to block 355. The optimal measurement mode is assigned as the working measurement mode for operation (block 350). According to the working measurement mode corresponding with a combination of a plurality of forward operations and a plurality of reverse operations, the touch control module 220 can control the first electrodes 211 connected to the driving voltage source and make the second electrodes 212 operated in the specific and defined order of the selected measurement mode. Then, the optimal measurement mode is assigned to be the working measurement mode for proximity detection, so the proximity detection is performing in use of the working measurement mode (block 360). Ultimately, the coordinates of the touched position are calculated based on the reporting results obtained with the working measurement mode when a proximity event has been detected (block 370).

If there is no any measurement mode which suffers merely insignificant noise impact, i.e. noise impact is above or equal to a noise threshold at the current operating frequency, the operating frequency of the touch control module 220 is required to be modified, e.g. to be decreased (block 380). Then, the touch control module 220 may be configured to return back to block 320 for execution of next iteration. Generally, the preset operating frequency is the maximum frequency that the touch control module 220 can work in order to have a fast reporting for proximity detection on the touch-sensitive apparatus 200. In the following description, the noise measurements mentioned in block 330 and the calculation process of the noise impact versus the designed measurement modes mentioned in block 330 will be described in details.

Figure 4:
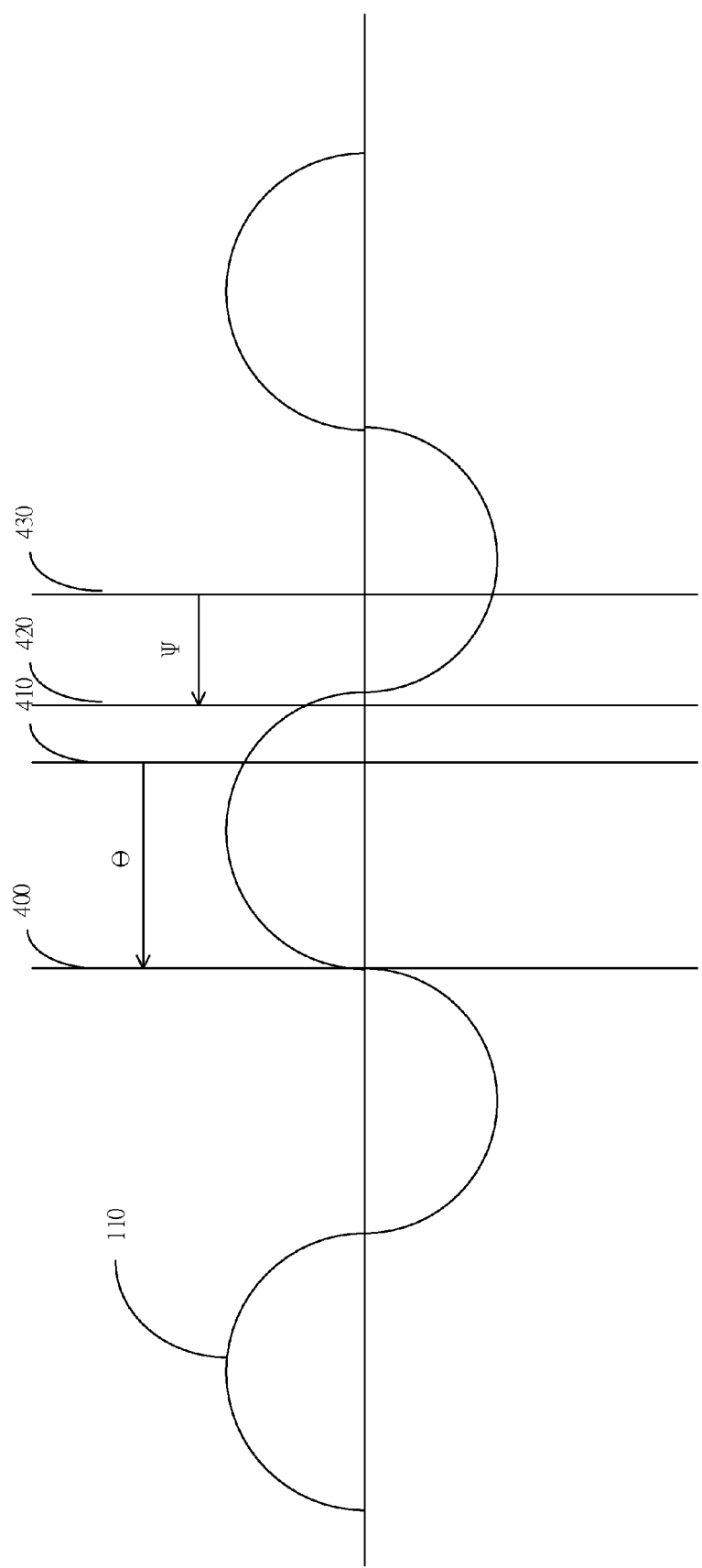
FIG. 4 is a sinusoidal waveform diagram illustrating one of the measured noise signals in accordance with an embodiment of the present invention.

In accordance with an embodiment of the present invention, FIG. 4 is a sinusoidal waveform diagram illustrating one of the measured noise signals. Referring to FIG. 4, the sinusoidal noise waveform herein may be indicative of the noise signal 110 or 102 as shown in FIG. 1, or any quasi-sinusoidal noise signal. It is noted that a signal at a given time point has a different phase at distinct frequency. There is a phase difference existing between a measurement signal and a sinusoidal noise signal. Providing that the sinusoidal noise signal is viewed as a sinusoidal wave 110, and the measured noise signal is just right in the beginning of a period at time 400 in FIG. 4. A person of ordinary skill in the art would understand that the noise signal 110 can be viewed as a co-sinusoidal wave. Assuming that the phase of the measured noise is viewed as 0 at time 400, the phase of the measured noise phase is viewed as θ at time 410. Because the amplitude and frequency of the noise signal 110 are unknown during noise measurement operation, provided that a phase difference for the noise signal 110 between two given time, i.e. ψ or 2πk+ψ, when measurement operation is conducted respectively at time 420 and 430, where k is integer, and k>=0.

Figure 5:
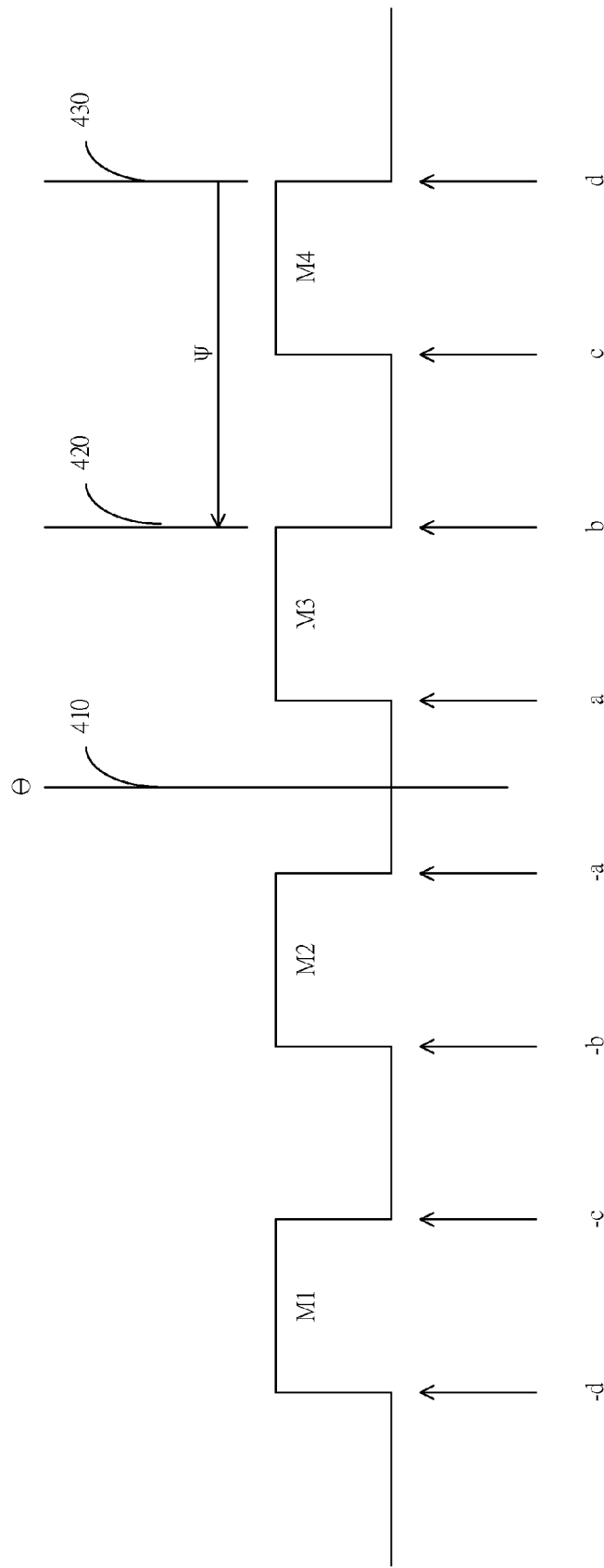
FIG. 5 is a waveform diagram associated with FIG. 4 illustrating the second electrodes are driven by a constant voltage during noise measurement phase in accordance with an embodiment of the present invention.

FIG. 5 is a voltage waveform diagram associated with FIG. 4 illustrating the second electrodes 212 to be driven by a constant voltage during noise measurement in accordance with an embodiment of the present invention. As mentioned above, the first electrodes 211 disconnected from a driving voltage source when the noise measurement is performed in block 320, the second electrodes 212 are configured in a floating potential to receive charge transfer from noise and the integrated amount of charge transfer or capacitances are read out afterwards. As shown in FIG. 5, there are totally four measurement cycles in a certain measurement mode, i.e. M1, M2, M3, and M4. Respectively at time −Td, −Tb, Ta, and Tc, the electrodes 212 are connected to a constant voltage, i.e. floating potential, and the amount of charge transfer or capacitances from noise are read out, afterwards, respectively at time −Tc, −Ta, Tb, and Td. The second electrodes 212 are reset to be configured in a ground potential upon completion of acquiring the voltage value of noise at time −Tc, −Ta, Tb, and Td.

In one embodiment, the four measurement cycles, i.e. M1, M3, M3, and M4, are performed at the same operating frequency, simultaneously, assuming that the interval between each of them has the same duration. In other words, provided that charging starts at time Ta and discharging starts at time Tb, the duration of charging can be, for example but not limited, the same as the duration of discharging. Referring to FIG. 5, assuming that the measured noise at the middle of measurement cycle M2 and M3, i.e. time 410, with phase θ corresponds to the sinusoidal noise at the time 410 as shown in FIG. 4. Besides, the contiguously measured noise signal at time Tb and Td exists a phase difference, i.e. ψ or 2πk+ψ, where k is an integer, and k>=0. The time Tb and Td which correspond respectively to time 420 and 430 as shown in FIG. 4.

During noise measurement in block 320, the measured voltage value at each time point shown in FIG. 5 can be represented by the following equations with sinusoidal waveform characteristic. If $X=(2\pi k+\psi)/4$, substitute X into all equations:

$Ta=A \sin(\theta+(2\pi k+\psi)/4)=A \sin(\theta+X)$ $Tb=A \sin(\theta+3\times(2\pi k+\psi)/4)=A \sin(\theta+3X)$ $Tc=A \sin(\theta+5\times(2\pi k+\psi)/4)=A \sin(\theta+5X)$ $Td=A \sin(\theta+7\times(2\pi k+\psi)/4)=A \sin(\theta+7X)$ $-Ta=A \sin(\theta-(2\pi k+\psi)/4)=A \sin(\theta-X)$ $-Tb=A \sin(\theta-3\times(2\pi k+\psi)/4)=A \sin(\theta-3X)$ $-Tc=A \sin(\theta-5\times(2\pi k+\psi)/4)=A \sin(\theta-5X)$ $-Td=A \sin(\theta-7\times(2\pi k+\psi)/4)=A \sin(\theta-7X)$ Where A represents the amplitude of the measured noise signal having a sinusoidal signal characteristic, and A does not represent the amplitude of the input noise signal 110 or 102 shown in FIG. 1.

At each measurement cycle, the noise strength, which is about the amount of noise charge transfer caused by a noise signal, is related to the charging start location in a measurement cycle and the voltage read out in a measurement cycle. For example, in measurement cycle M3, charging starts at time Ta and discharging at time Tb so the measured voltage value of noise is influenced by the amount of noise at time Ta and Tb. The voltage value of noise integrated upon completion of each measurement cycle, i.e. M1, M2, M3, and M4, can be represented respectively by the following equation:

$M1=A \sin(\theta-7X)-A \sin(\theta-5X)$ $M2=A \sin(\theta-X)-A \sin(\theta-3X)$ $M3=A \sin(\theta+3X)-A \sin(\theta+X)$ $M4=A \sin(\theta+7X)-A \sin(\theta+5X)$ According to one exemplary embodiment, the first measurement mode for measurement operation is defined with an order in sequence, e.g. "forward operation", "reverse operation", "forward operation" and "reverse operation". As mentioned above, the measured voltage output in response to "forward" and "reverse" operations about a proximity detection has a reverse voltage output. As a result, the amount of noise accumulated upon completion of the first measurement mode for measurement operation can be represented by (M2−M1)+(M4−M3) which can be represented by the following equation:

$(M2-M1)+(M4-M3)=A[\sin(\theta-X)-\sin(\theta-3X)-\sin(\theta-7X)+\sin(\theta-5X)+\sin(\theta+7X)-\sin(\theta+5X)-\sin(\theta+3X)+\sin(\theta+X)]$  Equation (1)

Noted that $\sin(\theta-X)+\sin(\theta+X)=2 \sin \theta \cos X$, so Equation (1) can be simplified to:

$(M2-M1)+(M4-M3)=2A \sin \theta(\cos X-\cos 3X-\cos 5X+\cos 7X)$  Equation (2)

It is noted that $\cos X+\cos 7X=2 \cos 4X \cos(-3X)=2 \cos 4X \cos 3X$, $\cos 3X+\cos 5X=2 \cos 4X \cos(-X)=2 \cos 4X \cos X$, so Equation (2) can become:

$$\begin{aligned}(M2-M1)+(M4-M3)&=2A\sin\theta\\&\quad(2\cos 4X\cos 3X-\\&\quad 2\cos 4X\cos X)\\&=4A\sin\theta\cos 4X\\&\quad(\cos 3X-\cos X)\\&=4A\sin\theta\cos 4X\\&\quad(-2\sin 2X\sin X)\\&=-8A\sin\theta\\&\quad\cos 4X\sin 2X\sin X\\&=-8A\sin\theta f1(X)\end{aligned}$$  Equation (3)

According to another exemplary embodiment, the second measurement mode for measurement operation is defined with an order in sequence, e.g. "forward operation", "reverse operation", "reverse operation" and "forward operation". As a result, the amount of noise accumulated upon completion of the first measurement mode for measurement operation can be represented by (M2−M1)+(M3−M4) which can be represented by the following equation:

(M2−M1)+(M3−M4)=A[sin(θ−X)−sin(θ−3X)−sin(θ−7X)+sin(θ−5X)+sin(θ+3X)−sin(θ+X)−sin(θ+7X)+sin(θ+5X)]   Equation (4)

Noted that $\sin(\theta-X)-\sin(\theta+X)=-2\cos\theta\sin X$, so Equation (4) can be simplified to:

(M2−M1)+(M3−M4)=−2A cos θ(sin X−sin 3X−sin 5X+sin 7X)   Equation (5)

Noted that sin X+sin 7X=2 sin 4X cos(−3X)=2 sin 4X cos 3X, sin 3X+sin 5X=2 sin 4X cos(−X)=2 sin 4X cos X, so Equation (5) can become:

$$(M2-M1)+(M4-M3) = -2A\cos\theta$$
$$(\sin X - \sin 3X - \sin 5X + \sin 7X)$$
$$= -4A\cos\theta\sin 4X$$
$$(\cos 3X - \cos X)$$
$$= -4A\cos\theta\sin 4X$$
$$(-2\sin 2X \sin X)$$
$$= 8A\cos\theta\sin 4X$$
$$\sin 2X \sin X$$
$$= 8A\cos\theta\, f2(X)$$

Equation (6)

According to still another example, the third measurement mode for measurement operation is defined with an order in sequence, e.g. "forward operation", "forward operation", "reverse operation" and "reverse operation". As a result, the amount of noise accumulated upon completion of the first measurement mode for measurement operation can be represented by (M3−M1)+(M4−M2) which can be represented by the following equation:

(M3−M1)+(M4−M2)=A[sin(θ+3X)−sin(θ+X)−sin(θ−5X)+sin(θ−7X)+sin(θ+7X)−sin(θ+5X)−sin(θ−X)+sin(θ−3X)]   Equation (7)

Noted that $\sin(\theta-X)+\sin(\theta+X)=2\sin\theta\cos X$, so Equation (7) can be simplified to:

(M3−M1)+(M4−M2)=2A sin θ(−cos X+cos 3X−cos 5X+cos 7X)   Equation (8)

Noted that cos 7X−cos X=−2 sin 4X sin(3X), cos 3X−cos 5X=−2 sin 4X sin(−X)=2 sin 4X sin X, so Equation (8) can become:

$$(M3-M1)+(M4-M2) = 2A\sin\theta$$
$$(-\cos X + \cos 3X - \cos 5X + \cos 7X)$$
$$= -4A\sin\theta\sin 4X$$
$$(2\cos 2X \sin X)$$
$$= -8A\sin\theta\sin 4X$$
$$\cos 2X \sin X$$
$$= -8A\sin\theta\, f3(X)$$

Equation (9)

In summary, the aforementioned three measurement modes for measurement operation can obtain respectively the three Equations (3), (6), and (9). The right-hand side of all three equations can be generally divided into two parts. One part is related to phase θ, e.g. −8A sin θ in Equation (3) and (9), 8A cos θ in Equation (6), and the other part can be described as a function of X such as f1(X) in Equation (3), f2(X) in Equation (6) and f3(X) in Equation (9). The part related to phase θ can get a value ranging from −8 to 8 on the ground of value of sin and cos [−1,1]. The other part related to a function of X can be deemed as a function of phase difference between two time points, i.e. ψ, due to X=(2πk+ψ)/4.

For any operating frequency, a phase difference of noise, i.e. ψ, exists between two measured voltage values measured at two time points. Therefore, f1(X), f2(X) and f3(X) can be also represented by g1(ψ), g2(ψ) and g3(ψ), which determine noise strength of whatever frequency of noise. The aforementioned noise impact, not noise strength, can be defined only by the product of f(θ) and g(ψ) so that it is independent from the number of measurement cycle. It is observed that the part related to phase θ is also not correlated to frequency of noise but correlated to measured amplitude of noise. Accordingly, the maximum of the part related to phase θ e.g. [−8 to 8] by measurement mode 1, 2, or 3 for measurement operation, can be defined as the threshold of noise strength. In other words, whether the noise impact is acceptable depends on the magnitude of the function of the phase difference, i.e. g(ψ). If the function of the phase difference, i.e. g(ψ), is below a predetermined value, the noise strength or noise impact, can be limited so as to the associated measurement mode which is acceptable for measurement operation.

Figure 6A:
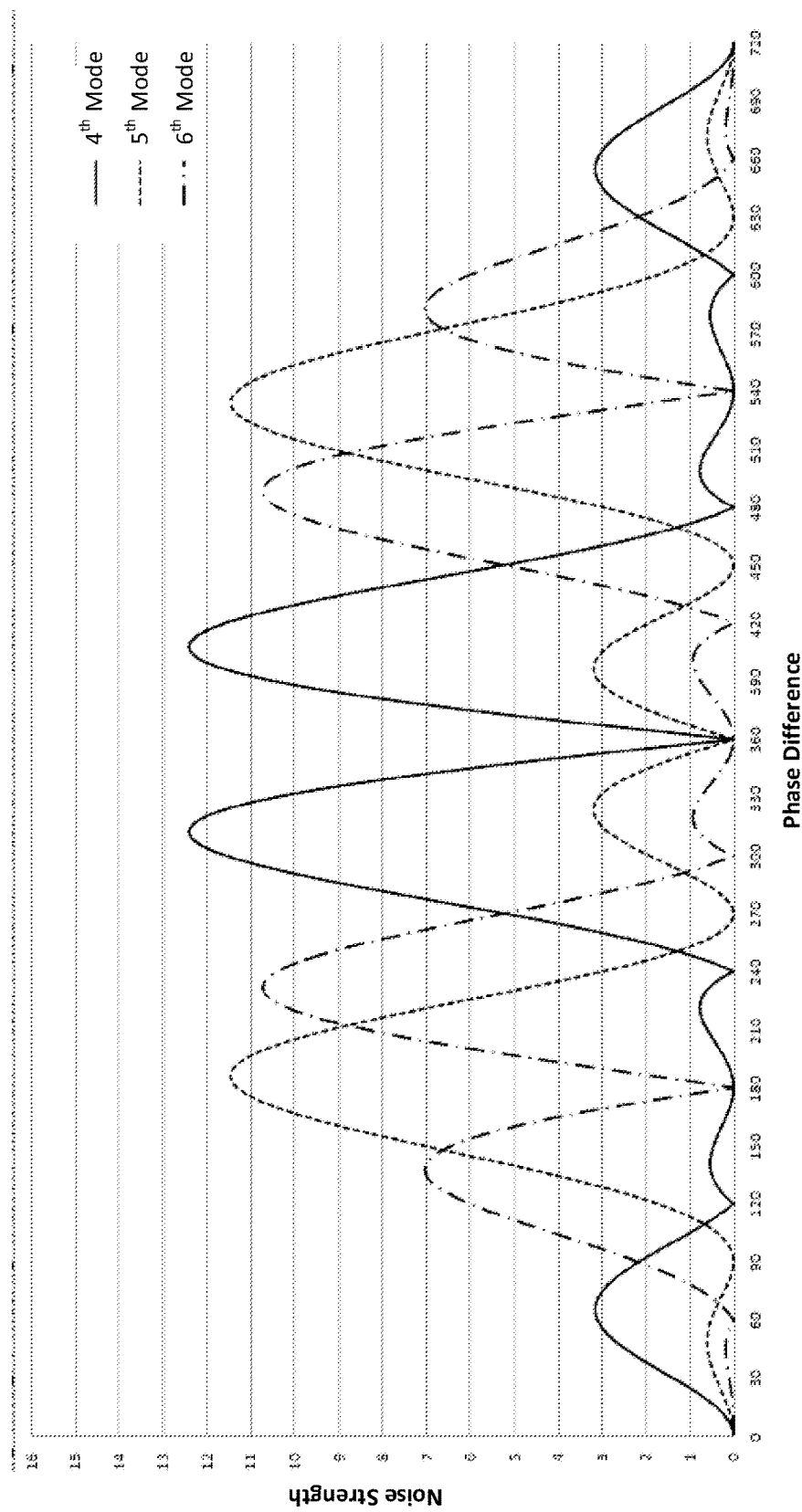
FIG. 6A is a diagram of noise strength with respect to phase difference of noise illustrating different graphs about noise strength respectively for three measurement modes in accordance with another embodiment of the present invention.

FIG. 6A is a diagram of noise strength with respect to phase difference of noise illustrating different graphs about noise strength respectively for three measurement modes in accordance with another embodiment of the present invention. There are three measurement modes of measurement operation as shown in FIG. 6A, respectively, the $4^{th}$ measurement mode, the $5^{th}$ measurement mode, and the $6^{th}$ measurement mode. The exemplary embodiment in FIG. 6A are based on six measurement cycles, i.e. M1, M2, M3, M4, M5 and M6, in a certain measurement mode for measurement operation while the aforementioned exemplary embodiment in FIG. 5 are based on four measurement cycles. It is appreciated that embodiments of the present invention may be practiced with eight or more measurement cycles provided that the noise phase is θ locating in the middle of these measurement cycles. According to the same manner as described in FIG. 5, a general measured noise strength on the right-hand side of an equations (10) can be expressed regardless of how many measurement cycles and whatever measurement mode for measurement operation operating conducted on the left-hand side of the equation (10):

$$c * A f(\theta) g(\psi)$$   Equation (10)

where c represents a constant value, A represents the amplitude of the measured noise signal, f(θ) represents a noise function with phase θ based on a sinusoidal (or cosinusoidal) noise signal, and g(ψ) represents a function of phase difference between any two time points of the sinusoidal noise signal. For the purpose of simplicity and clarity, assuming that the constant value, i.e., c is 16 based on six measurement cycles.

Referring to FIG. 6A, the noise strength operating by the $4^{th}$, $5^{th}$, and $6^{th}$ measurement mode for measurement operation can be represented respectively by the following equations:

$$16A \sin \theta (\sin X \sin 6X \cos 2X \cos 2X) \quad \text{Equation (11)}$$

$$16A \sin \theta (\sin X \sin 2X \cos 4X \cos 4X) \quad \text{Equation (12)}$$

$$-16A \cos \theta (\sin X \cos 6X \sin 2X \sin 2X) \quad \text{Equation (13)}$$

The $4^{th}$ measurement mode for measurement operation is defined with an order in sequence "forward operation", "forward operation", "forward operation", "reverse operation", "reverse operation" and "reverse operation"; the $5^{th}$ measurement mode for measurement operation is defined with an order in sequence "forward operation", "reverse operation", "forward operation", "reverse operation", "forward operation" and "reverse operation"; the $6^{th}$ measurement mode for measurement operation is defined with an order in sequence "forward operation", "reverse operation", "forward operation", "forward operation", "reverse operation" and "forward operation". Take the $4^{th}$ measurement mode for example, it is observed that the noise impact is approaching to 0 if any one of sin X, sin 6X, cos 2X, or cos 2X is approaching to 0.

As shown in FIG. 6A, the noise strength varies along with the phase difference. If only one single measurement mode is operated, a strong noise measured at a certain phase difference may result in a false measurement of proximity detection. For example, the noise strength is about 11 when the phase difference is at 180° ($=\pi$) by the operation of the $5^{th}$ measurement mode, while the noise strength is about 0 at the same phase difference by the operation of the $4^{th}$ measurement mode.

Figure 7A:
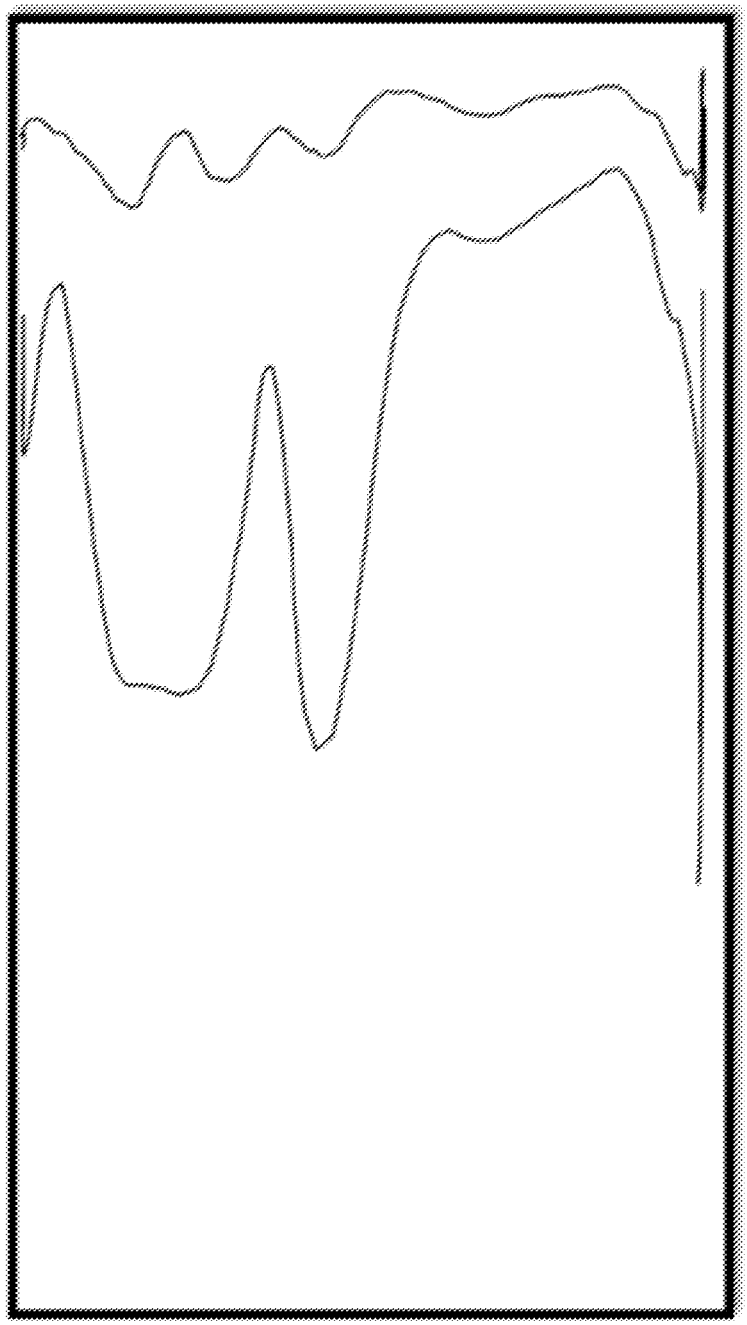
FIG. 7A is a test result from line drawing experiment with two fingers.
Figure 7B:
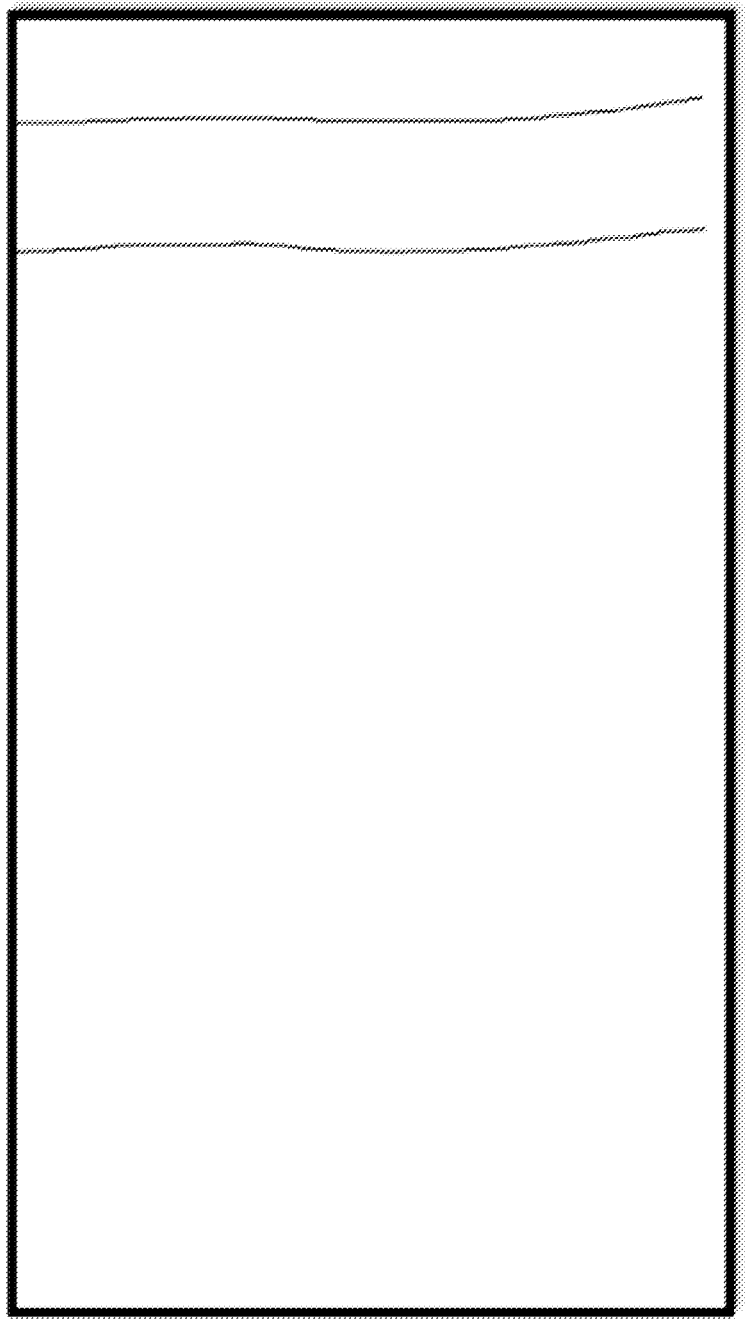
FIG. 7B is another test result from line drawing experiment with two-finger touch.

If the operating frequency of the touch control module 220 for proximity detection is operating at 28 KHz by the $5^{th}$ measurement mode for measurement operation, the noise signal is at 14 KHz in terms of phase difference at 180° ($=\pi$). An experiment of drawing two straight lines in a parallel with two fingers on a touch screen has been done. As shown in FIG. 7A, the two plotted lines are not parallel at all, and it is indicative of a severe noise interference existing. Referring to FIG. 7B, in case the operating frequency of the touch control module 220 for proximity detection is operating at 28 KHz by the $4^{th}$ measurement mode for measurement operation, the noise signal is still at 14 KHz in terms of phase difference at 180° ($=\pi$). However, the amplitude for observation purpose is changed to be five times as large as that shown in FIG. 7A, i.e. 15$V_{PP}$ (peak-to-peak noise voltage). The two plotted lines shown in FIG. 7B are almost parallel, and it is indicative of only slight noise interference existing. Thus, one of ordinary skill in the art would understand that the result of noise interference is such distinct by using a different measurement mode for measurement operation against noise. In this manner to handle any other frequency of noise, the touch control system can enhance anti-noise capability by switching to a measurement mode with slight noise impact at a certain frequency of noise for measurement operation.

Figure 6B:
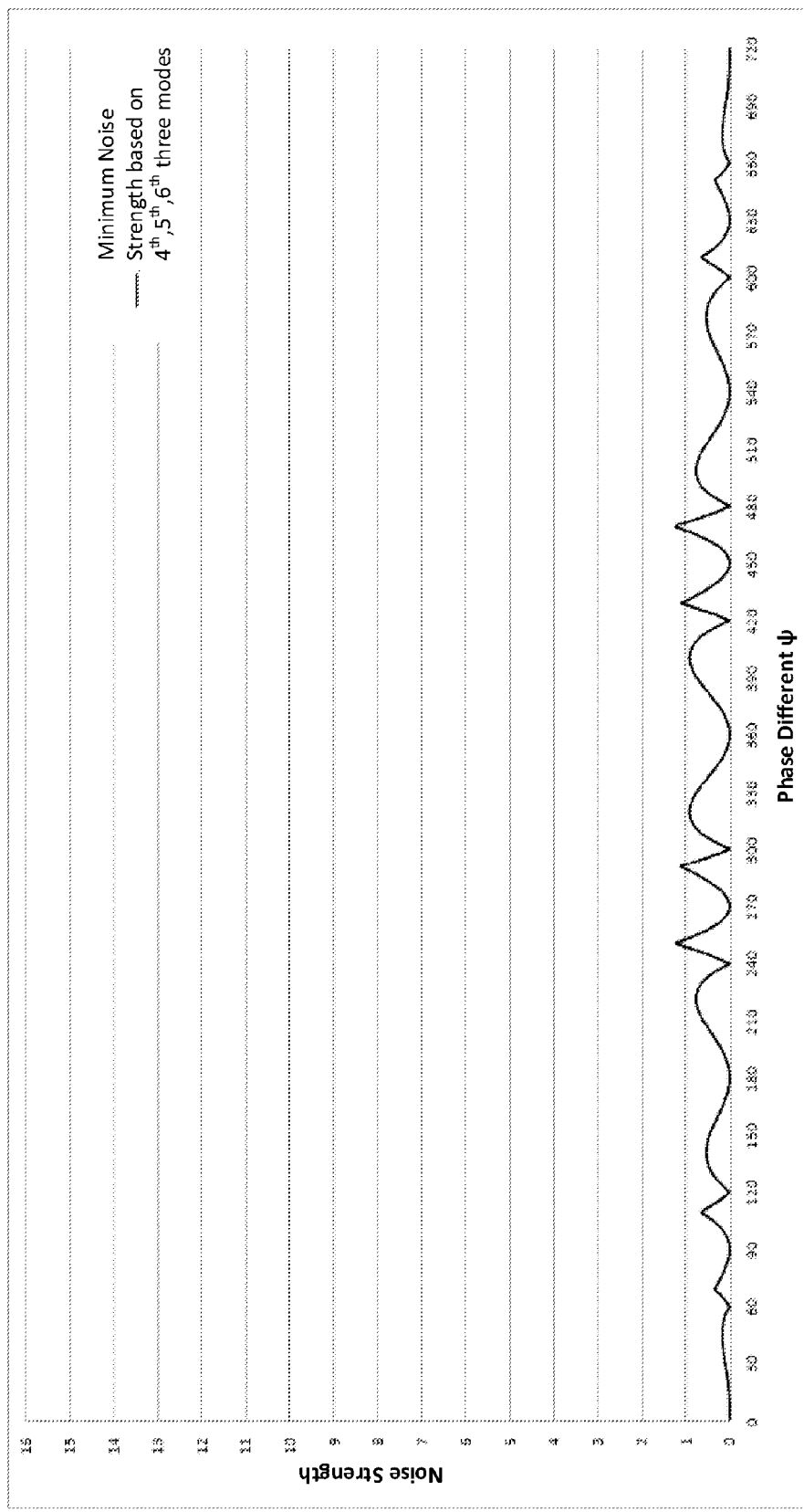
FIG. 6B is a diagram of minimum noise strength with respect to phase difference of noise based on three measurement modes for measurement operation shown in FIG. 6A.

FIG. 6B is a diagram of minimum noise strength with respect to phase difference of noise based on three measurement modes for measurement operation shown in FIG. 6A. As shown in FIG. 6B, the minimum noise strength with respect to phase difference of noise is formed by taking every point of minimum noise strength with respect to every phase difference from among the three graphs representing three measurement modes for measurement operation. It can be realized that the noise strength is controlled in a limited range when a right measurement mode for measurement operation is selected among a plurality of measurement modes.

In one exemplary embodiment, provided that the number of the designed measurement modes for measurement operation is N, there are M cycles required to be performed for each measurement mode so that the operations of noise measurement are totally M*N times in block 320. For example, in the embodiment shown in FIG. 5, when the number of measurement cycle is four, there are totally 12 times of noise measurement to be performed. When the number of measurement modes is six, there are totally 24 times of noise measurement to be conducted in a series. In one exemplary embodiment, it includes a step of averaging noise in block 320 by taking K times of noise measurements for average. Take the example illustrated in FIG. 6A, the measurement cycle is equal to 6, and there are 3 measurement modes, i.e. the $4^{th}$, $5^{th}$, and $6^{th}$ measurement modes for measurement operation as well as taking four (K=4) times of measurement results for average. As a result, a determination of whether at least one measurement mode is with an acceptable noise impact in block 340 may spend at least 3 ms if each measurement cycle is 40 us. (40 us*3*6*4=2880 us~=3 ms)

In another exemplary embodiment, provided that the operations of noise measurement are totally only M times in block 320 when the noise impact only considers g($\psi$). In this embodiment, assuming that $\theta$ is fixed and f($\theta$) is ignored. It is noted that the errors for evaluation of measurement modes are made when all the measurement modes for measurement operation are not uniformly correlated to either "sin $\theta$" or "cos $\theta$". It will be understood by those skilled in the art that the value of sin $\theta$ and cos $\theta$ is not the same. For example, if the $1^{st}$ and $3^{rd}$ measurement modes which are uniformly correlated to sin $\theta$ are selected for measurement operation, in this case there are only number of M measurement operations to be conducted for a determination of whether at least one measurement mode with an acceptable noise impact. Take the example illustrated in FIG. 6A, the measurement cycle is equal to 6, and there are 3 measurement modes, i.e. the $4^{th}$, $5^{th}$, and $6^{th}$ measurement mode for measurement operation as well as taking four (K=4) times of measurement results for average. As a result, a determination of whether at least one measurement mode is with an acceptable noise impact in block 340 may spend at least 1 ms if each measurement cycle is 40 us. (40 us*6*4=960 us~=1 ms)

In another exemplary embodiment, provided that at least one measurement mode is correlated to sin $\theta$ and at least another measurement mode is correlated to cos $\theta$. In this case, it need to conduct at least M+1 measurement operation in block 320 for evaluating noise impact with respect to measurement modes. In another word, the M measurement operations in the front of all measurement operations are taken as a basis of a measurement mode for measurement operation while the M measurement operations in the rear of all measurements are taken as a basis of another measurement mode. The two different measurement modes can be compared to determine which measurement mode is with better noise impact since the two different measurement modes have different phase. For example, the measurement cycle is equal to 6, and four (K=4) times of measurement results are taken for average. As a result, a determination of whether at least one measurement mode is with an acceptable noise impact in block 340 may spend at least 0.4 ms if each measurement cycle is 40 us. (40 us*[(6+4)−1]=360 us~=0.4 ms)

Further, if noise measurement operated via a measurement mode that takes the M measurement operations in the front of all measurement operations with phase $\theta$ while the phase is equal to θ+ψ for another measurement mode based on the M measurement operations in the rear of the all measurements. For this kind of measurement operation, a general measured noise on the right-hand side of the equations (10) can be modified as follows:

$$c*A[f(\theta)+f(\theta+\psi)]g(\psi) \quad \text{Equation (14)}$$

When ψ is approaching to 180° (≈π), f(θ)+f(θ+ψ) is approaching to 0 as f(θ) is a sinusoidal or cosinusoidal function. Accordingly, the right-hand side of the equations (14) is approaching to 0. This characteristic can enhance a complementary relationship existing between measurement modes for measurement operation.

Figure 8:
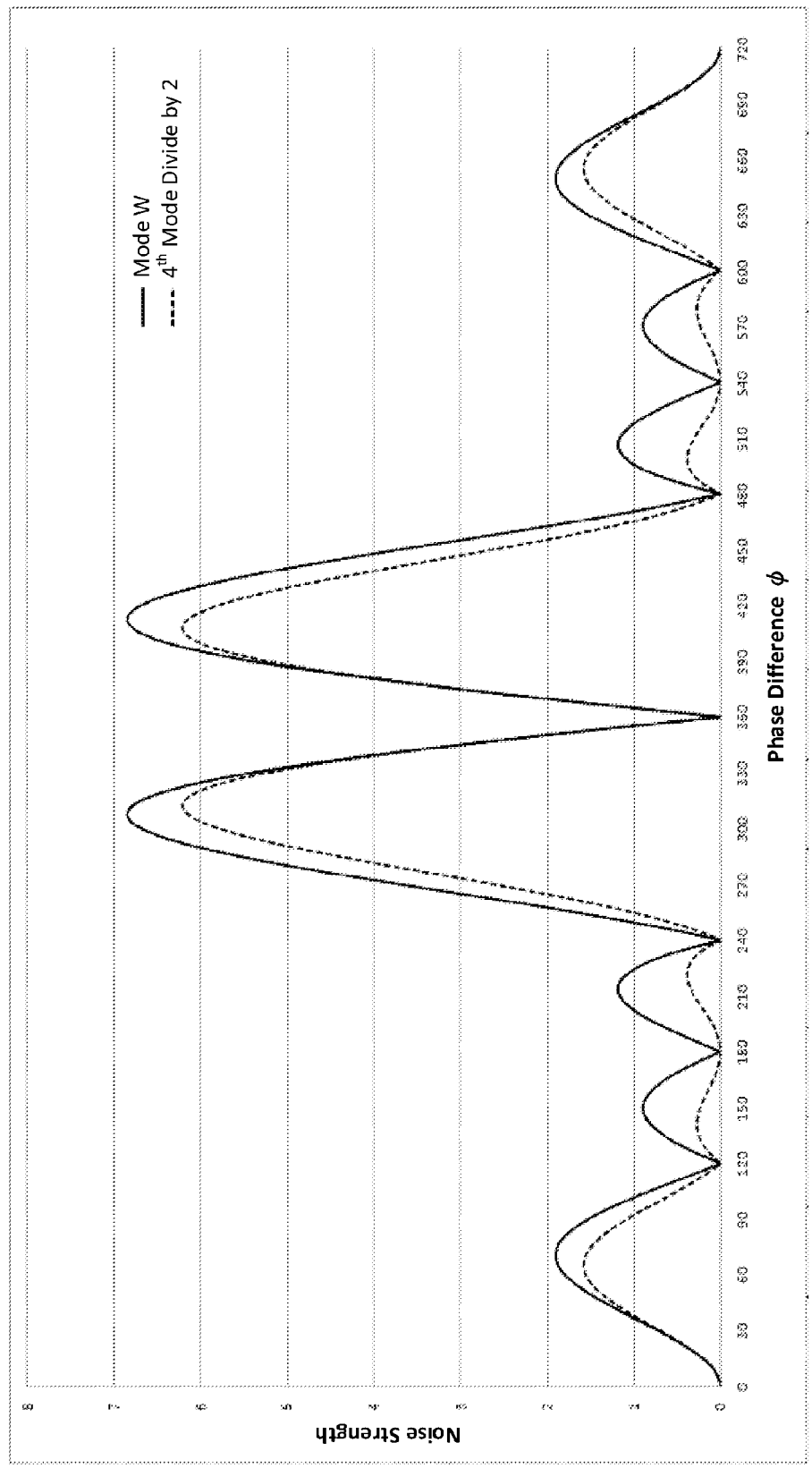
FIG. 8 is a diagram of noise strength with respect to phase difference of noise about measurement mode W and the $4^{th}$ measurement mode.

For example, if a measurement mode W is designed for measurement operation based on four measurement cycles as shown in FIG. 5, i.e. M1, M2, M3, and M4. By taking the three measurements in the front, i.e. M1-M3, and taking the three measurements in the rear, i.e. M2-M4 to form the $4^{th}$ measurement mode shown in FIG. 6A. Referring to FIG. 8, the noise strength with respect to phase difference of noise about the measurement mode W and the $4^{th}$ measurement mode are illustrated. The constant value, i.e. c, is correlated to the number of measurement cycles to be operated in a certain measurement mode, the noise strength corresponding with the $4^{th}$ measurement mode having six measurement cycles is required to be adjusted for comparing with that corresponding with the measurement mode W having four measuring cycles. Therefore, noise strength of the $4^{th}$ measurement mode dividing by 2 is shown in FIG. 8. It is observed that noise strength of the $4^{th}$ measurement mode dividing by 2 is below or equal to 0.3 when the phase difference of noise is between 120° and 240°. The complementary relationship between measurement modes seems to be working out. So to speak, the $4^{th}$ measurement mode seems having better anti-noise effect than the measurement mode W.

If the g(ψ) of the measured noise strength taken from M measurement operations in the front of all measurement operations is just equal to a reverse signal of the g(W) of the measured noise strength taken from M measurement in the rear of all measurement operation, in this manner, noise can be reduced around the phase difference of noise equaling to 0° or 360°, because the measured noise strength is approaching to 0 when ψ is near 0° or 360°.

Certainly, the design of measurement modes by taking from M measurement operations in the front and in the rear of all measurement operation includes, but not limited to, only one different measurement operation between the measurement modes. The general measured noise on the right-hand side of the equations (14) should be extendedly modified as follows:

$$c*A[f(\theta)+f(\theta+n*\psi)]g(\psi) \quad \text{Equation (15)}$$

where n is an integer and n>=1.

A person of ordinary skill in the art would understand that according to some embodiments of the present invention, noise measurements can be made for more than M times and a variety of M measurement operations in sequence are taken for noise impact calculation versus N measurement modes. In one embodiment, noise measurements are made for (M+N−1) times and various M measurement operations in a sequence taken respectively among these (M+N−1) operations as N measurement modes. Provided that the measurement operation for (M+N−1) times are denoted as $M_1, M_2, \ldots M_{M+N-1}$, the M measurement operations, i.e. $M_1, M_2, \ldots M_M$, are taken as a basis of the first measurement mode. The M measurement operations, i.e. $M_2, M_3 \ldots M_{M+1}$, are taken as a basis of the second measurement mode. The reset may be deduced by analogy, so the M measurement operations, i.e. $M_N, M_{N+1} \ldots M_{M+N-1}$, are taken as a basis of the $N^{th}$ measurement mode.

Referring to the FIG. 3, the process of selecting a measurement mode for operation in block 350 is based on the calculated noise impact (alternatively called evaluation of noise) in block 330 and decision block 340 which screens measurement modes to pick out at least one measurement mode with evaluation of noise below a noise threshold. In one embodiment, provided that the aforementioned first measurement mode, second measurement mode, and third measurement mode have been operated separately for noise measurement and with individual noise impact calculated, and an optimal measurement mode which has the minimum noise impact is selected in block 350. It is appreciated that the noise measurement operation will be remained to be operating in the working measurement mode, e.g. the second measurement mode, but not switching to be operating in the selected measurement mode e.g. the third mode, even though the evaluation of noise corresponding with the selected is smaller than that corresponding with the working measurement mode.

In still another embodiment, a mechanism of evaluating stability of measurement modes is also included in block 355. The working measurement mode is not replaced by the selected measurement mode from decision block 340 until the method 300 has been redone continuously for a couple times and demonstrate that the selected measurement mode has an optimal noise impact than the working measurement mode in a consecutive redoing iterations for a couple time. In another word, when a plurality of evaluation of noise from a plurality of consecutive iterations corresponding with the selected measurement mode are stably smaller than the evaluation of noise corresponding with the working measurement mode, the optimal measurement mode is assigned as the working measurement mode in block 355.

As mentioned above, the noise strength corresponding with a certain measurement mode is required to be adjusted for comparing with that corresponding with another measurement mode when the number of measurement cycles is not the same between each other. In yet another embodiment, a mechanism of evaluating stability of measurement modes is also included in block 355, the mechanism includes a step of checking whether the optimal measurement mode is the same one as the working measurement mode. If the optimal measurement mode is not the same as the working measurement mode, the method 300 goes back to redo from block 320 until the number of redoing iterations is equaling to P times, and the method 300 goes forward to assign the optimal measurement mode to be a working measurement mode when the optimal measurement mode has a better noise impact than the working measurement mode in consecutive redoing iterations for the number of redoing iterations equaling to Q times where Q is positive integer and Q<P. It is appreciated that the above mentioned three embodiments are about maintenance of stability for measurement operations. In other embodiment, the mechanism of evaluating stability of measurement mode can be skipped, the optimal measurement mode which has the minimum noise impact is directly assigned as the working measurement mode in block 355.

In above description, the operating frequency for noise measurement and touch detection is required to be modified in block 380 when all of the evaluations of noise for all measurement modes at the current frequency are equal to or above a noise threshold. In one embodiment, the operating frequency for noise measurement and touch detection is decreased. Provided that the aforementioned 5$^{th}$ measurement mode is separately operated for noise measurement at 25 KHz and 20 KHz under an environment with noise at 8 KHz, the measured phase difference of noise, i.e. ψ or 2πk+ψ, is 115° at 25 KHz while the measured phase difference of noise is 144° at 20 KHz. Referring to the graph of the 5$^{th}$ measurement mode in FIG. 6A, it is observed that the value of the noise strength is 0.57 when phase difference of noise=115° at 25 KHz while the value of the noise strength is 5.92 when phase difference=144° at 20 KHz. Accordingly, decreasing operating frequency for noise measurement cannot acquire a reduced noise strength.

In still another embodiment, if there is noise of higher frequency in the environment such as 88 KHz, the aforementioned 5$^{th}$ measurement mode is separately operated for noise measurement at 25 KHz and 20 KHz, the measured phase difference of noise, i.e. ψ or 2πk+ψ, is 547° at 25 KHz while the measured phase difference of noise is 144° at 20 KHz. Still referring to the graph of the 5$^{th}$ measurement mode in FIG. 6A, it is observed that the value of the noise strength is about 11 when phase difference of noise=547° at 25 KHz while the value of the noise strength is 5.92 when phase difference=144° at 20 KHz. Accordingly, decreasing operating frequency for noise measurement can reduce the noise strength from about 11 to 5.92 by using the 5$^{th}$ measurement mode for operation.

Noted that the distinction between the manner of measurement mode switching from among various measurement modes and a common manner of frequency hopping from among various frequencies is that the manner of measurement mode switching adopts a fixed operating frequency in use of various measurement modes for measurement operation. As mentioned above and summarized in the following Table 1, the two frequencies 25 KHz and 20 KHz seems acceptable in term of noise strength (0.57 at 25 KHz and 5.92 at 20 KHz) when the 5$^{th}$ measurement mode is adopted for operation under an environment with noise at 8 KHz. However, when there is noise of higher frequency in the environment such as 88 KHz, the noise strength are much worse (about 11 at 25 KHz and 5.92 at 20 KHz). The two frequencies 25 KHz and 20 KHz becomes not applicable frequency to reduce noise strength, alternatively noise impact. No matter how many frequencies as operating frequency are tried, there is not an operating frequency, which can have less noise interference, namely, noise strength or noise impact with respect to any frequency of noise is all below a noise threshold.

TABLE 1

| Operating Frequency | Frequency of Noise | Phase Difference | Noise Strength |
|---|---|---|---|
| 25 kHz | 8 kHz | 115.2 | About 1 |
| 20 kHz | 8 kHz | 144 | About 6 |
| 25 kHz | 88 kHz | 547.2 | About 11 |
| 20 kHz | 88 kHz | 144 | About 6 |

From another perspective, switching measurement mode from among various measurement modes for measurement operation can reach the effect of avoiding noise interference with respect to any frequency of noise under the premise of a fixed operating frequency. For example, when the operating frequency is fixed at 25 KHz, the noise strength depending on a different measurement mode for operation with respect to frequency of noise appears not uniform as shown in the following Table 2.

TABLE 2

| Measurement Mode | Frequency of Noise | Phase Difference | Noise Strength |
|---|---|---|---|
| 4$^{th}$ Mode | 8 kHz | 115.2 | About 0.5 |
| 5$^{th}$ Mode | 8 kHz | 115.2 | About 1 |
| 4$^{th}$ Mode | 88 kHz | 547.2 | About 0.1 |
| 5$^{th}$ Mode | 88 kHz | 547.2 | About 11 |
| 4$^{th}$ Mode | 88 kHz | 547.2 | About 0.1 |
| 5$^{th}$ Mode | 88 kHz | 547.2 | About 11 |

In one embodiment, the operating frequency can be divided by a variable number N where N is an integer and N>1. Namely, the post-modified operating frequency is reduced to 1/N times of the pre-modified operating frequency. In a preferred embodiment, N can be six. In another embodiment, N can be a predetermined positive integer or a positive integer which is related to how high or how low the pre-modified operating frequency is. When the post-modified operating frequency appears lower than the lowest operating frequency, the operating frequency either does not be modified or is directly set to the lowest operating frequency.

Figure 9:
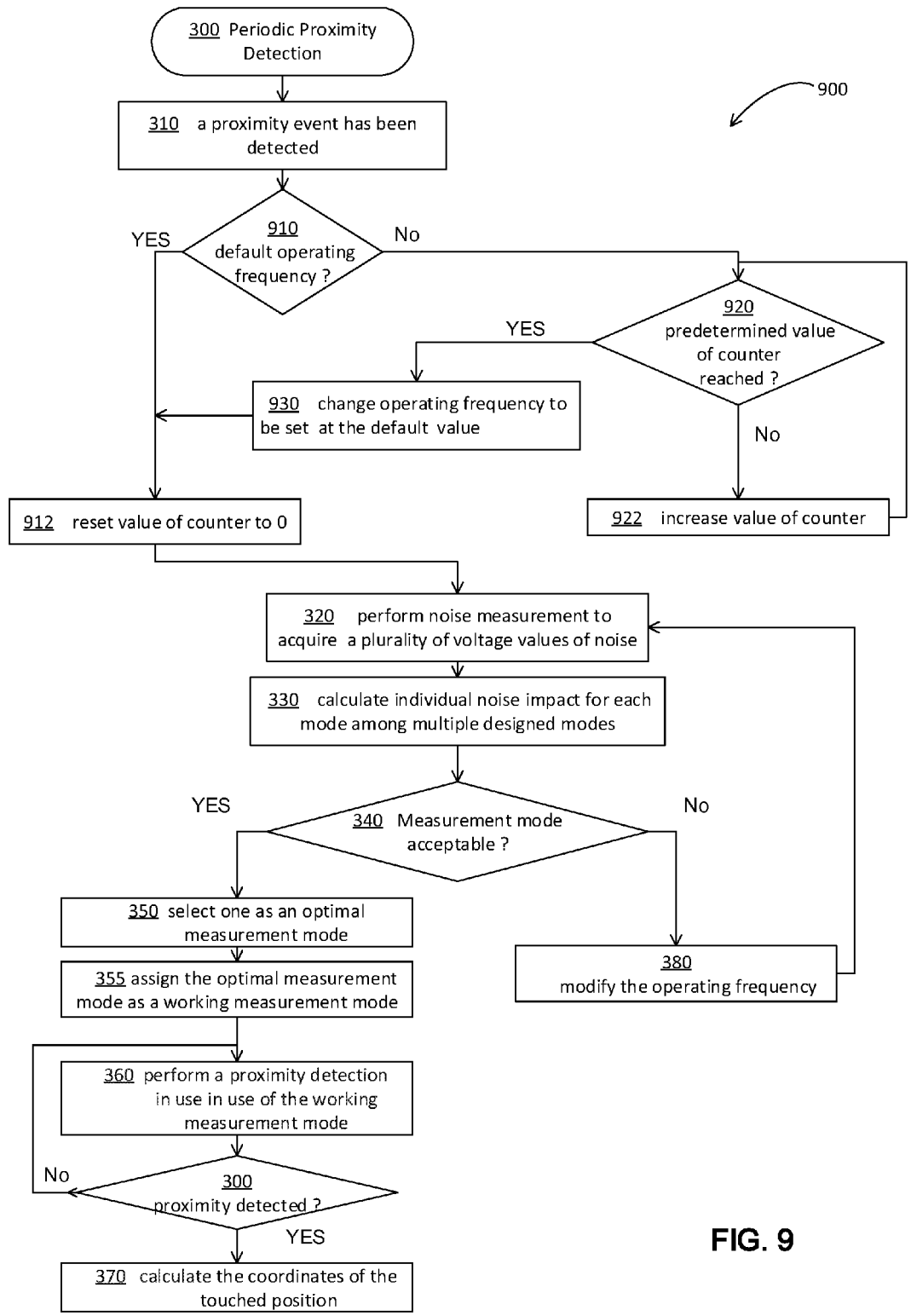
FIG. 9 is a flowchart illustrating a method for determining a coordinate position in response to a proximity detection for a touch-sensitive apparatus in accordance with another embodiment of the present invention.

FIG. 9 is a flowchart illustrating a method for determining a coordinate position in response to a proximity detection for a touch-sensitive apparatus in accordance with another embodiment of the present invention. As mentioned above, according to one embodiment, the method 900 can be implemented in the form of programs stored into non-volatile memory 222 and executed by the central processor 230 which is embedded in the touch control module 220. Alternatively, according to another embodiment, the method 900 can be implemented in the form of logic circuits.

Noted that the method 900 is based on the method 300 and adds several blocks 910, 912, 920, 922 and 930. As described above, the operating frequency is likely to be modified in block 380 during identifying an optimal measurement mode for measurement operation. The touch control module 220 performs method 900 which can reduce noise interference for proximity detection of fingers by a user on a touch-sensitive apparatus, starting with a default operating frequency, so these blocks are added to the method 900 to make sure the operating frequency set at the default value. Please refer to the above description for understanding the same blocks as the method 300. The system will be unstable if the operating frequency is modified too often. For maintaining stability, the key mechanism is a counter implemented for maintaining stability of the touch-sensitive apparatus implementation, which can count up to a predetermined value, to wait for the apparatus ready to be operating at a changed operating frequency.

When a proximity event has been detected in block 310, the method proceeds to check whether the operating frequency is reset to a default value for a new iteration (block 910). If the touch control module 220 is operating at the default operating frequency (YES from block 910), the value of the counter is reset to 0 (block 912). If not so (NO from block 910), the method proceeds to check whether the value of the counter has reached the predetermined value (block 920). If the value of the counter has reached the predetermined value (YES from block 920), the touch control module 220 changes to be operating at the default operating frequency (block 930). Afterwards, the value of the counter is reset to 0 (block 912). If not so (NO from block 920), the value of the counter is increased (block 922). The method 900 proceeds to perform noise measurement (block 320) after the block 912 is completely executed.

In block 930, the operating frequency is restored back to the default operating frequency by raising the current operating frequency. In one embodiment, provided that the post-modified operating frequency is N times of the pre-modified operating frequency where N is a positive integer and N>1. In a preferred embodiment, N can be six. In another embodiment, N can be a predetermined positive integer or a positive integer depending on the pre-modified operating frequency which is high or low to be determined. When the post-modified operating frequency appears larger than the highest operating frequency, the operating frequency can be directly set to the highest operating frequency. When the configuration of operating frequency is done, the value of the counter is reset to 0 (block 912). The method 900 proceed to perform noise measurement (block 320) after the block 912 is completely executed.

A person of ordinary skill in the art would understand that the method 300 and method 900 are executed in a manner of iteration according to some embodiments of the present invention. For example, when a proximity event has been detected at each time, the following blocks in method 900 are triggered to start execution for a new iteration. After an optimal measurement mode is selected in block 350, a step of validity checking whether the selected mode is the same one from two consecutive iterations can be included. When the selected mode from block 350 in the preceding iteration is not the same as the selected mode from block 350 in the succeeding iteration, the waveform of the driving signal supplied to the touch-sensitive module 210 based on the selected mode will be different from the block 350 in the preceding iteration and from the block 350 in the succeeding iteration. As a result, the method 900 can be executed more iterations for validation in case the selected mode is not the same from two consecutive iterations.

For instance, the selected mode from block 350 in the preceding iteration is the first mode, which is defined with an order in sequence for measurement operation, e.g. "forward operation", "reverse operation", "forward operation" and "reverse operation". The waveform of the driving signal supplied to the first electrodes 211 of the touch-sensitive module 210 is formed according to the first mode. Assuming that the selected mode from block 350 in the succeeding iteration is the second mode, which is defined with an order in sequence, e.g. "forward operation", "reverse operation", "reverse operation" and "forward operation". As a result, the waveform of the driving signal supplied to the first electrodes 211 of the touch-sensitive module 210 is changed to be formed according to the second mode. From perspective of time, the first electrodes 211 are disconnected from the driving voltage source during the block 320 of the preceding iteration is executing, and the waveform of the driving signal supplied to the first electrodes 211 is observed according to the first mode when the block 360 in the preceding iteration is executing. Next, the first electrodes 211 are disconnected from the driving voltage source during the block 320 of the succeeding iteration is executing, and the waveform of the driving signal supplied to the first electrodes 211 is observed according to the second mode when the block 360 in the succeeding iteration is executing. Therefore, the method 900 will be redone one more iteration for verification.

In the summary of the above descriptions, the present disclosure proposes a method with noise handling, which can identify an optimal measurement mode with more slight electromagnetic interference for proximity detection operation, especially sinusoidal noise interference, and thereby the accuracy of proximity detection operation can be improved.

While the preferred embodiments of the present invention have been illustrated and described, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention; instead, it is intended that the present invention include all embodiments falling within the scope of the appended claims.

What is claimed is:

1. A method operable in a touch-sensitive apparatus for measuring noise, wherein the touch-sensitive apparatus comprises a touch-sensitive module having a plurality of first electrodes and a plurality of second electrodes that intersect in multiple regions of the touch sensitive module, said method comprising the steps of:

disconnecting the first electrodes from a driving voltage source;

acquiring a plurality of voltage values of noise by measuring a plurality of voltage signals associated with the second electrodes over a plurality of measurement cycles at a predetermined operating frequency during no driving voltage supplied to the first electrodes; and calculating respectively an evaluation of noise corresponding with each of designed measurement modes according to the acquired voltage values of noise, wherein each designed measurement mode corresponds to a combination of a plurality of forward operations and a plurality of reverse operations, and the number of the plurality of measurement cycles is M*N*K where N represents the number of the plurality of designed measurement modes, M represents the number of cycles to be performed for each mode, and K presents the number of measurement cycles taken for average.

2. The method according to claim 1, wherein further comprising a step of connecting the second electrodes to a voltage at the beginning of each of the measurement cycles in order to receive charges from noise and then the plurality of voltage values of noise are read out over each of the plurality of measurement cycles.

3. The method according to claim 1, wherein further comprising a plurality of intervals between the plurality of measurement cycles, and the duration of each interval is equal to the duration of each measurement cycle.

4. The method according to claim 1, wherein the disconnecting the first electrodes from a driving voltage source is executed when a proximity event on the touch-sensitive module has been detected.

5. The method according to claim 1, wherein the voltage signals respectively correlate to a sinusoidal noise signal or a cosinusoidal noise signal.

6. The method according to claim 5, wherein the sinusoidal or cosinusoidal noise signal is a noise function with phase θ, where θ corresponds to a time point between the measurement cycles.

7. A method operable in a touch-sensitive apparatus for measuring noise, wherein the touch-sensitive apparatus comprises a touch-sensitive module having a plurality of first electrodes and a plurality of second electrodes that intersect in multiple regions of the touch sensitive module, said method comprising the steps of:

disconnecting the first electrodes from a driving voltage source;

acquiring a plurality of voltage values of noise by measuring a plurality of voltage signals associated with the second electrodes over a plurality of measurement cycles at a predetermined operating frequency during no driving voltage supplied to the first electrodes; and calculating respectively an evaluation of noise corresponding with each of designed measurement modes according to the acquired voltage values of noise, wherein each designed measurement mode corresponds to a combination of a plurality of forward operations and a plurality of reverse operations, and the number of the plurality of measurement cycles is M*K where M represents the number of cycles to be performed for each designed measurement mode and K represents the number of measurement cycles taken for average, and the plurality of designed measurement modes are correlated to the same sinusoidal or cosinusoidal function.

8. The method according to claim 7, wherein further comprising a step of connecting the second electrodes to a voltage at the beginning of each of the measurement cycles in order to receive charges from noise and then the plurality of voltage values of noise are read out over each of the plurality of measurement cycles.

9. The method according to claim 7, wherein further comprising a plurality of intervals between the plurality of measurement cycles, and the duration of each interval is equal to the duration of each measurement cycle.

10. The method according to claim 7, wherein the disconnecting the first electrodes from a driving voltage source is executed when a proximity event on the touch-sensitive module has been detected.

11. The method according to claim 7, wherein the voltage signals respectively correlate to a sinusoidal noise signal or a cosinusoidal noise signal.

12. The method according to claim 11, wherein the sinusoidal or cosinusoidal noise signal is a noise function with phase $\theta$, where $\theta$ corresponds to a time point between the measurement cycles.

13. A method operable in a touch-sensitive apparatus for measuring noise, wherein the touch-sensitive apparatus comprises a touch-sensitive module having a plurality of first electrodes and a plurality of second electrodes that intersect in multiple regions of the touch sensitive module, said method comprising the steps of:

disconnecting the first electrodes from a driving voltage source;

acquiring a plurality of voltage values of noise by measuring a plurality of voltage signals associated with the second electrodes over a plurality of measurement cycles at a predetermined operating frequency during no driving voltage supplied to the first electrodes; and calculating respectively an evaluation of noise corresponding with each of designed measurement modes according to the acquired voltage values of noise, wherein each designed measurement mode corresponds to a combination of a plurality of forward operations and a plurality of reverse operations, and the number of the plurality of measurement cycles is M+K−1 where M represents the number of cycles to be performed for each designed measurement mode and K represents the number of measurement cycles taken for average.

14. The method according to claim 13, wherein further comprising a step of connecting the second electrodes to a voltage at the beginning of each of the measurement cycles in order to receive charges from noise and then the plurality of voltage values of noise are read out over each of the plurality of measurement cycles.

15. The method according to claim 13, wherein further comprising a plurality of intervals between the plurality of measurement cycles, and the duration of each interval is equal to the duration of each measurement cycle.

16. The method according to claim 13, wherein the disconnecting the first electrodes from a driving voltage source is executed when a proximity event on the touch-sensitive module has been detected.

17. The method according to claim 13, wherein the voltage signals respectively correlate to a sinusoidal noise signal or a cosinusoidal noise signal.

18. The method according to claim 17, wherein the sinusoidal or cosinusoidal noise signal is a noise function with phase $\theta$, where $\theta$ corresponds to a time point between the measurement cycles.

* * * * *